US010019143B1

(12) United States Patent
Haitani et al.

(10) Patent No.: US 10,019,143 B1
(45) Date of Patent: Jul. 10, 2018

(54) DETERMINING A PRINCIPAL IMAGE FROM USER INTERACTION

(71) Applicant: Amazon Technologies, Inc., Seattle, WA (US)

(72) Inventors: Robert Yuji Haitani, Seattle, WA (US); Charles Shearer Dorner, Seattle, WA (US); Janet Ellen Galore, Seattle, WA (US); Dominick Khanh Pham, Seattle, WA (US); Gonzalo Alberto Ramos, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 517 days.

(21) Appl. No.: 14/500,348

(22) Filed: Sep. 29, 2014

(51) Int. Cl.
*G06F 17/30* (2006.01)
*G06F 3/0484* (2013.01)
*G06F 3/0482* (2013.01)
*G06Q 30/06* (2012.01)
*G06K 9/62* (2006.01)

(52) U.S. Cl.
CPC ........ *G06F 3/04845* (2013.01); *G06F 3/0482* (2013.01); *G06Q 30/0643* (2013.01); *G06F 17/30598* (2013.01); *G06F 17/30601* (2013.01); *G06F 17/30696* (2013.01); *G06F 17/30705* (2013.01); *G06F 17/30713* (2013.01); *G06K 9/6217* (2013.01)

(58) Field of Classification Search
CPC ........ G06F 17/30247; G06F 17/30554; G06F 17/30873; G06F 17/30572; G06F 17/30864; G06F 17/30994; G06F 17/30601; G06F 17/30713; G06F 17/30705; G06F 17/30696; G06F 17/30598; G06Q 30/0643; G06K 9/6217
See application file for complete search history.

(56) References Cited

U.S. PATENT DOCUMENTS

| | | | |
|---|---|---|---|
| 6,414,677 B1 * | 7/2002 | Robertson | G06F 3/04815 345/419 |
| 6,615,208 B1 * | 9/2003 | Behrens | G06F 17/3069 707/754 |
| 7,536,654 B2 * | 5/2009 | Anthony | G06T 3/40 715/730 |
| 7,715,621 B2 * | 5/2010 | Cieplinski | G06F 17/3025 382/165 |

(Continued)

*Primary Examiner* — Shen Shiau
(74) *Attorney, Agent, or Firm* — Knobbe, Martens, Olson & Bear, LLP

(57) ABSTRACT

Systems and methods are provided for determining a principal image from a collection of images presented in a perspective view. A perspective view of images may be interactive and/or images may simultaneously increase or decrease in size in response to user interaction. Methods and/or techniques may be used to determine a principal image from a set of images based on a direction, speed, and/or velocity of movement or user interaction. A principal image in the perspective view may be the largest currently presented image and/or may be presented at the forefront to the user. Furthermore, an animation and/or video may be presented to the user following a determination of a principal image and/or after a configurable period of time without subsequent user interaction, which may further highlight or bring attention to a particular item to the user.

20 Claims, 9 Drawing Sheets

(56) References Cited

U.S. PATENT DOCUMENTS

| | | | |
|---|---|---|---|
| 8,009,919 B2 * | 8/2011 | Baiping | G06F 17/30265 348/333.01 |
| 8,095,521 B2 * | 1/2012 | Chan | G06Q 30/02 707/705 |
| 9,448,633 B2 * | 9/2016 | Rodgers | G06T 13/80 |
| 2002/0033848 A1 * | 3/2002 | Sciammarella | G06F 3/0481 715/838 |
| 2003/0018652 A1 | 1/2003 | Heckerman | |
| 2008/0201280 A1 | 8/2008 | Martin | |
| 2011/0029561 A1 * | 2/2011 | Slaney | G06F 17/30247 707/772 |
| 2011/0103700 A1 | 5/2011 | Haseyama | |
| 2011/0314362 A1 * | 12/2011 | Richardson | G06Q 30/0276 715/205 |
| 2012/0072863 A1 * | 3/2012 | Akifusa | G06F 3/0482 715/784 |
| 2012/0072870 A1 * | 3/2012 | Akifusa | G06F 3/0482 715/830 |
| 2012/0075433 A1 * | 3/2012 | Tatzgern | G06T 11/60 348/50 |
| 2012/0086650 A1 * | 4/2012 | Oiwa | G06F 3/0482 345/173 |
| 2013/0226922 A1 * | 8/2013 | Labenski | G06F 17/30705 707/737 |
| 2015/0019530 A1 | 1/2015 | Felch | |
| 2015/0170333 A1 * | 6/2015 | Jing | G06T 3/40 345/660 |
| 2015/0193109 A1 * | 7/2015 | Takahashi | G06F 3/04855 715/833 |
| 2015/0234472 A1 * | 8/2015 | Park | G06F 3/017 345/175 |

\* cited by examiner

DETERMINING A PRINCIPAL IMAGE FROM USER INTERACTION

BACKGROUND

Retailers, merchants and sellers involved in electronic commerce often provide user interfaces from which a user may browse products included in an electronic catalog and/or search an electronic catalog for products available for purchase. For example, the user may browse or scroll through a grid or list of items. A page or user interface will sometimes provide the user with narrowing category filters or criteria to revise a collection of items when browsing or searching. The user will then be provided with an updated grid or list of items based on the selected category filters or criteria. In some user interfaces, such filter options may be presented as checkboxes, menu items, or fields that accept entry of numeric ranges. Typically, options or categories to filter items have been predetermined or manually categorized by a human.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1A:
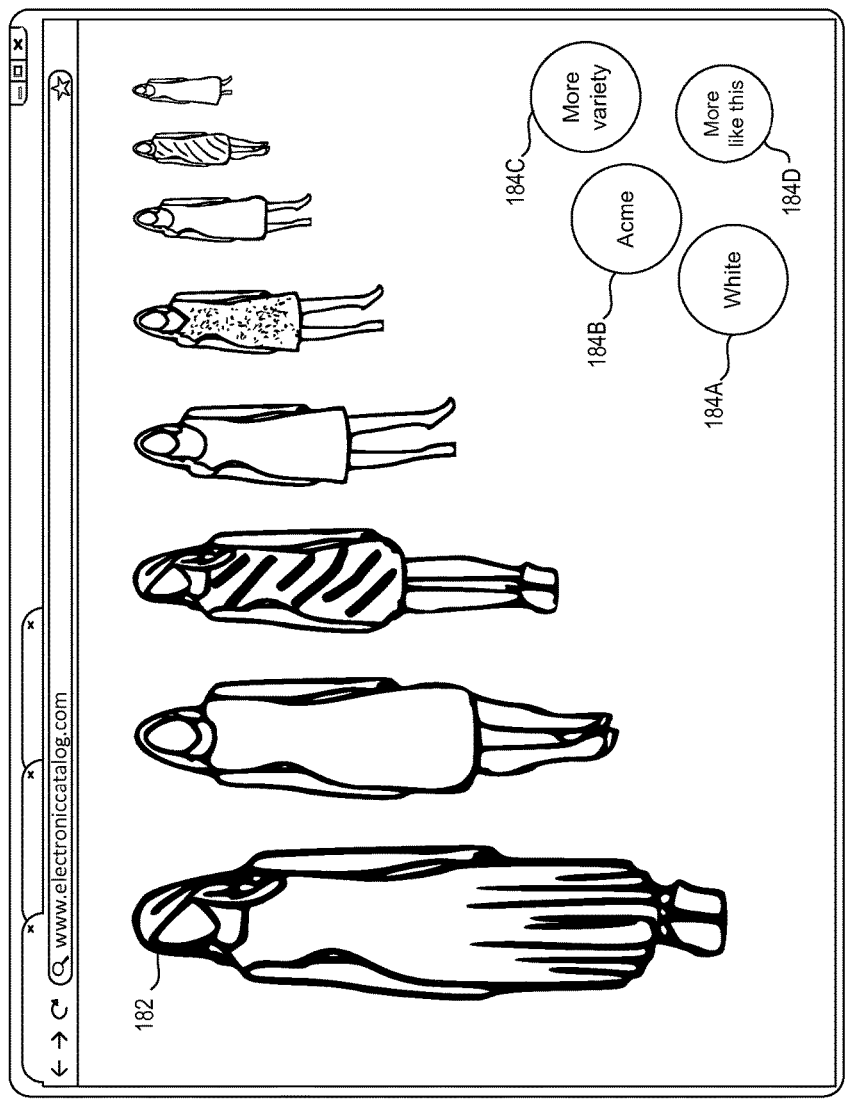
FIG. 1A is a pictorial diagram illustrating an example user interface, which includes a collection of items and/or images, generated at least in part by an interaction service.

Due to the ever-increasing amount of information available to users of electronic catalog services and other network services, there is an ongoing need to implement user-friendly mechanisms to dynamically browse and/or discover items (e.g., goods and/or services) represented by digital images within an electronic catalog or data store. Such images are often presented together in a user interface illustrating multiple items, for example, collections of items returned in response to a search request of an electronic catalog, or items grouped together in a collection based on category, context, content, or other factors. However, such collections may contain large quantities of items and, therefore, the collection may be overwhelming and/or unmanageable for a user to quickly search the items to locate an item or subset of items of interest to the user. Thus, in some embodiments, it may be advantageous to present items and/or images in a simplified perspective view that is user-friendly and/or that provides powerful tools for discovering new items and/or pivoting off of the current item. For example, a perspective view may simplify the process for locating items because a user may browse the perspective view instead of searching. Other advantages may include enhancing the user experience to be less cumbersome and/or more recreational/intuitive (e.g., browsing items instead of selecting one or more checkboxes or complex filters to locate an item), providing a more efficient pan and/or zoom model for viewing and/or browsing multiple item images at once, creating a more manageable way for a user to scan items and/or images, providing simpler methods to refine the narrowing and/or filtering process, providing additional information associated with an item, and/or automatically providing inspirations for browsing or generating collections of items that are akin to human selected collections. As used herein, "additional information" of an item may include additional text, details, summary data, views, images, and/or perspectives of an item. Therefore, a need exists to provide a simplified user experience for browsing collections of items in an efficient and interactive manner.

Generally described, aspects of the present disclosure relate to generating a perspective view of items and/or images, determining collections of similar items for browsing, and/or updating the collection of images to focus on a principal image. For example, according to some embodiments, when a user interface or page is generated, as described herein, content may be selected to present in the user interface. The content may include interactive, selectable item images, presented in a perspective view that are each associated with a corresponding item. A user interaction with the user interface may result in a dynamic update to the collection of presented images based on different dimensions and/or attributes of similarity. For example, a user interaction may include selecting a "more like this" or "similar colors" option to determine a new collection of items based on the selected option. In some embodiments, the perspective view may focus on, highlight, and/or present a principal image as the largest and/or at the forefront. Determination of a principal image may be based on calculations of speed, velocity, acceleration, deceleration, and/or decay rates related to a user interaction with the user interface. It will be appreciated that, in some embodiments, collections of images and/or items described herein may be partially or wholly created, selected, and/or manually curated by a human user and/or operator. In some embodiments, the user interface may be configured to animate and/or display additional information associated with the principal image based on subsequent user interactions or lack thereof. Thus, a user may browse item images in a unique and/or simplified manner.

Embodiments for efficient and interactive browsing of items described herein may be well suited for presenting images from certain types of item collections. For example, an interactive image presentation described herein may be used for displaying images of collections of dresses. Although examples discussed herein are often described with respect to dress images, this is for illustrative purposes and is not meant to limit the scope of the presentation or browsing techniques described herein, which can be used to accommodate other types of images and items as well. For example, collections of coats, textiles, furniture, toys, clothing, drapes, shoes, appliances, electronic devices, cars, suits, and lamps, to name a few, could also benefit from the efficient and interactive image browsing and/or pivoting discussed herein. Accordingly, various types of items and/or images may be presented in some of the embodiments described herein.

In some embodiments, an electronic catalog system, as described herein, may include or be in communication with a data store of information about items that may be listed for sale, lease, etc. by an electronic marketplace, sellers, merchants and/or other users. The item information in this data store may be viewable by end users through a browsable or searchable electronic catalog in which each item may be described in association with a network page describing the item (which may be referred to herein as an item detail page and/or display). Each item detail page may include, for example, an item image and description, customer ratings, customer and professional reviews, sales rank data, lists of related items, and/or other types of supplemental data that may assist consumers in making informed purchase decisions. Users of the system may, in some embodiments, locate specific item detail pages within the electronic catalog by executing search queries, navigating a browse tree and/or using various other navigation techniques. As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system.

As used herein, the term "dimension," in addition to having its ordinary meaning, may refer to an attribute, property and/or characteristic of an item and/or item image that may be used for clustering. Non-limiting examples of dimensions include color, brand, metadata, text, and/or visual characteristics of an image and/or item (e.g., length or pattern of a dress). Furthermore, the term "clustering," as used herein, may refer to the process of grouping a set of items in such a way that items in the same group and/or cluster are more similar (in one or more respects) to each other than to those in other groups and/or clusters. In some embodiments, clustering may be accomplished via one or more known techniques and/or algorithms in artificial intelligence, machine learning, unsupervised learning, supervised learning, semi-supervised learning, vector representation, and/or some combination thereof. Multidimensional clustering may refer to using one or more dimensions for the clustering process, which is described in further detail below.

While a retail environment is often used as an example below, it will be appreciated that methods for determining collections of items and/or interacting with collections of items, as disclosed herein, may be used in a variety of environments other than a retail environment. For example, aspects of the present disclosure, in some embodiments, may be used and/or implemented to efficiently browse items within any user interface, page, video, electronic book and/or other electronic content. Without limitation, aspects of the present disclosure may be used for efficient item browsing and/or pivoting of item images in social networking contexts, digital photo albums, digital news articles, and/or visual bookmarking contexts. For illustrative purposes, item images are often described below in the context of items listed in an electronic catalog. Alternatively, in other embodiments, item images that may be presented according to the systems and methods described herein may include advertisements, images in news articles, editorial content, videos, classified listings, auction listings and/or any other content that may be electronically presented to a user.

FIG. 1A is a pictorial diagram illustrating an example user interface 180 generated at least in part by an interaction service, which will be described in further detail below. As illustrated, user interface 180 may present images in a perspective view. For example, principal image 182 may be the largest item image relative to the other currently presented item images in user interface 190. In some embodiments, the aisle and/or perspective view may correspond to an asymmetrical layout that emulates a runway, such as a fashion show runway with models. In some embodiments, the images of models may be customized and/or personalized by the user. For example, the interaction service may receive preferences for models, such as gender, hair color, height, body type, and/or other characteristics of models. Additionally or alternatively, the interaction service may present model images that mimic the user and/or the ultimate purchaser of the item and/or apparel. As used herein, the term "aisle" may refer to a collection of images generally aligned in a path and/or following a line or arc. It will be appreciated that the entire "aisle" and/or collection of items may not be presented to the user in a single display and/or user interface. For example, the currently presented items may update, such as when a user browses and/or interacts with the collection of items and/or aisle. Item images presented in user interface 180 may correspond to and/or substantially follow one or more lines, arcs, bezier curves, and/or horizon lines, which may be aesthetically pleasing to users.

User interface 180 may include various user interface controls and/or options, such as user interface controls 184A-184D for pivoting, changing, and/or filtering aisles, which will be described in further detail below. In some embodiments, user interface controls 184A-184D may be presented in user interface 180 in response to a user selection of image 182. User interface option 184A, "White," may correspond to a request for an update of the set and/or collection of items based on a color dimension, dimension type, and/or attribute type. User interface option 184B, "Acme," may correspond to brand or metadata dimensions, dimension types, and/or attribute types. User interface options 184C and/or 184D may correspond to two or more dimensions, dimension types, and/or attribute types. Determining collections from dimensions and/or attributes is described in further detail below. While not illustrated, the aisle and/or perspective view may be combined with other presentation views, such as a grid of items and/or images, according to some embodiments. More information regarding linking and/or combining different presentation areas, such as linking an aisle view with a presentation grid, may be found in U.S. patent application Ser. No. 14/304,607 ("the '607 Application"), filed Mar. 24, 2014, entitled "INTERACTIVE ITEM FILTERING USING IMAGES," which is hereby incorporated herein by reference in its entirety.

Figure 1B:
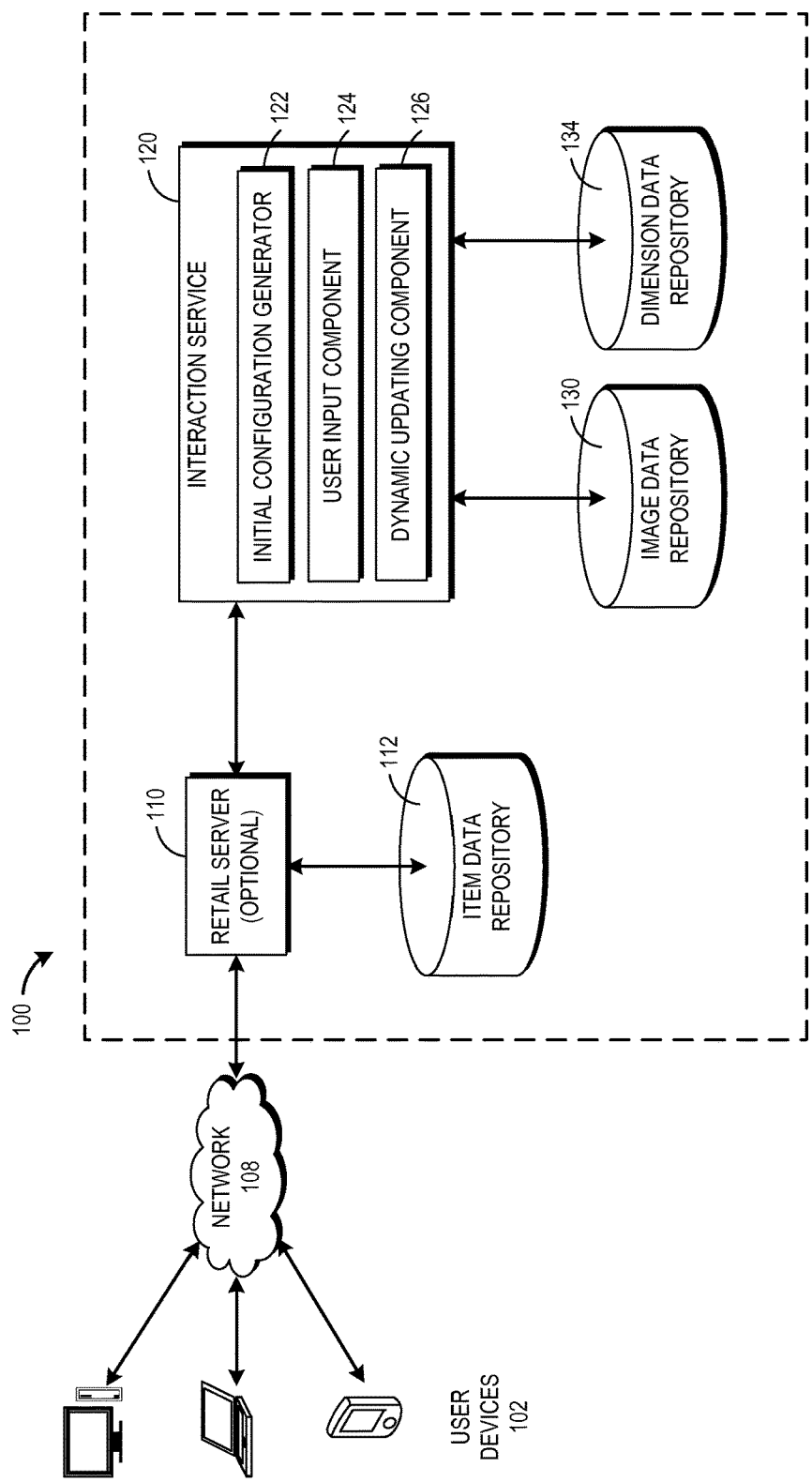
FIG. 1B is a block diagram depicting an illustrative operating environment for presenting users with interactive collections of items and/or images.

The illustrative operating environment shown in FIG. 1B includes an electronic marketplace system 100 that enables users to browse and place orders for items (such as items listed in an electronic catalog). The marketplace system 100 may include one or more interaction services 120 that include an initial configuration generator 122, a user input component 124, and a dynamic updating component 126 stored in memory therein that may be used to implement various aspects of the present disclosure, such as generating an initial configuration and/or collection of items, analyzing user input with respect to the initial collection, dynamically updating the initial collection based on the user input, and other aspects discussed herein. The marketplace system 100 may also include one or more retail servers 110 that facilitate electronic browsing and purchasing of items, such as goods and/or services, using various user devices, such as user computing devices 102. In some embodiments, user interfaces and/or representations shown in FIGS. 1A, 4A-4D, 6A-6D, and/or FIGS. 7A-7B may be presented on user computing devices 102. Those skilled in the art will recognize that the user computing devices 102 may be any of a number of computing devices that are capable of communicating over a network including, but not limited to, a laptop, personal computer, personal digital assistant (PDA), hybrid PDA/mobile phone, mobile phone, smartphone, wearable computing device, electronic book reader, digital media player, tablet computer, gaming console or controller, kiosk, augmented reality device, other wireless device, set-top or other television box, and the like.

The retail server 110 may be connected to and/or in communication with an item data repository 112 that stores item information, metadata, and/or attributes regarding a number of items, such as items listed in an electronic catalog as available for browse and/or purchase via the retail server 110. Item data stored in item data repository 112 may include any information related to each item. For example, item data may include, but is not limited to, price, availability, title, item identifier, text (e.g., a text description associated with an item), metadata, item images, item description, item attributes, attribute and/or dimension values associated with an item, keywords associated with the item, etc. In some embodiments, the item data repository 112 may store digital content items (e.g., videos, animations, audiobooks, electronic books, music, movies, multimedia works, etc.). The retail server 110 may also be connected to or in communication with a user data store (not illustrated) that stores user data associated with users of retail server 110, such as account information, purchase history, purchase data, browsing history, item selection history, item reviews and ratings, personal information, user preferences, location information, etc. As described below, data from a user data store may be used by interaction service 120 to determine collections of items. The interaction service 120 may be connected to and/or in communication with an image data repository 130 that may be used to store a primary image associated with each of the number of items that can be displayed to represent the item in an aisle and/or collection. For example, the primary image may be used to represent the item in a collection for browsing items, a user-generated collection, or any other collection. Multiple images can be associated with an item, for instance to aid a user in a purchase decision regarding the item.

In some embodiments, interaction service 120 may be connected to and/or in communication with dimension data repository 134. Dimension data repository 134 may store the available dimensions and/or dimension types, attributes and/or attribute types, and/or other data that may be used for the clustering of items, which is described in further detail below. For example, the results of clustering methods described below and/or clustering data may be stored in dimension data repository 134, such as a cache of cluster results that may be used to enhance performance of interaction service 120. In some embodiments, dimension data repository 134 may store a mapping from the available dimensions and/or attributes to the respective item data, image data, and/or attribute or dimension values. As described above, item and/or image data may be stored in item data repository 112 and/or image data repository 130.

In some embodiments, each of item data repository 112, image data repository 130 and/or dimension data repository 134 may be local to interaction service 120, may be local to retail server 110, may be remote from both interaction service 120 and retail server 110, and/or may be a network-based service itself. The item data repository 112, image data repository 130 and/or dimension data repository 134 may be embodied in hard disk drives, solid state memories, any other type of non-transitory computer-readable storage medium, and/or a file, a database, a relational database, in-memory cache, and/or stored in any such non-transitory computer-readable medium accessible to the retail server 110. The item data repository 112, image data repository 130 and/or dimension data repository 134 may also be distributed or partitioned across multiple local and/or storage devices without departing from the spirit and scope of the present disclosure.

It will be recognized that many of the devices described above are optional and that embodiments of the environment 100 may or may not combine devices. Furthermore, devices need not be distinct or discrete. Devices may also be reorganized in the environment 100. For example, the interaction service 120 may be represented in a single physical server or, alternatively, may be split into multiple physical servers. In some embodiments, the entire interaction service may be represented in a single computing device, such as user computing device 102. Additionally, the environment 100 may not include a network 106.

Additionally, in some embodiments, the translation service is implemented by one more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "cloud" computing environment.

In the environment shown in FIG. 1B, a user of the marketplace system 100 may utilize a user computing device 102 to communicate with the retail server 110 via a communication network 108, such as the Internet or other communications link. The network 108 may be any wired network, wireless network or combination thereof. In addition, the network 108 may be a personal area network, local area network, wide area network, cable network, satellite network, cellular telephone network, etc. or combination thereof. In addition, the network 108 may be a personal area network, local area network, wide area network, over-the-air broadcast network (e.g., for radio or television), cable network, satellite network, cellular telephone network, or combination thereof. For example, the network 108 may be a publicly accessible network of linked networks, possibly operated by various distinct parties, such as the Internet. In some embodiments, the network 108 may be a private or semi-private network, such as a corporate or university intranet. The network 108 may include one or more wireless networks, such as a Global System for Mobile Communications (GSM) network, a Code Division Multiple Access (CDMA) network, a Long Term Evolution (LTE) network, or some other type of wireless network. The network 108 can use protocols and components for communicating via the Internet or any of the other aforementioned types of networks. Protocols and components for communicating via the Internet or any of the other aforementioned types of communication networks are well known to those skilled in the art and, thus, are not described in more detail herein.

The marketplace system 100 is depicted in FIG. 1B as operating in a distributed computing environment including several computer systems that are interconnected using one or more computer networks. The marketplace system 100 could also operate within a computing environment having a fewer or greater number of devices than are illustrated in FIG. 1B. Thus, the depiction of marketplace system 100 in FIG. 1B should be taken as illustrative and not limiting to the present disclosure. For example, the marketplace system 100 could implement various Web services components and/or peer-to-peer network configurations to implement at least a portion of the processes described herein.

In brief, the retail server 110 is generally responsible for providing front-end communication with various user devices, such as a user computing device 102, via network 108. The front-end communication provided by the retail server 110 may include generating text and/or graphics, possibly organized as a user interface using hypertext transfer or other protocols in response to information inquiries received from the various user devices. The retail server 110 may obtain information on available goods and services from one or more data stores, such as item data repository 112, as is done in conventional electronic commerce systems. In certain embodiments, the retail server 110 may also access item data from other data sources, either internal or external to marketplace system 100. While marketplace system 100 is often described herein with respect to an embodiment in which the interaction service 120 communicates with a retail server 110 in a retail environment, in other embodiments, interaction service 120 may operate independently of a retail environment. In some such embodiments, the interaction service 120 may communicate with a user computing device 102 without the presence of a retail server, or may communicate with another server responsible for providing front-end communication with the computing device 102. In other embodiments, the retail server 110 may include or implement an interaction service, as described herein, such that a separate interaction service 120 may not be present in certain embodiments.

Figure 1C:
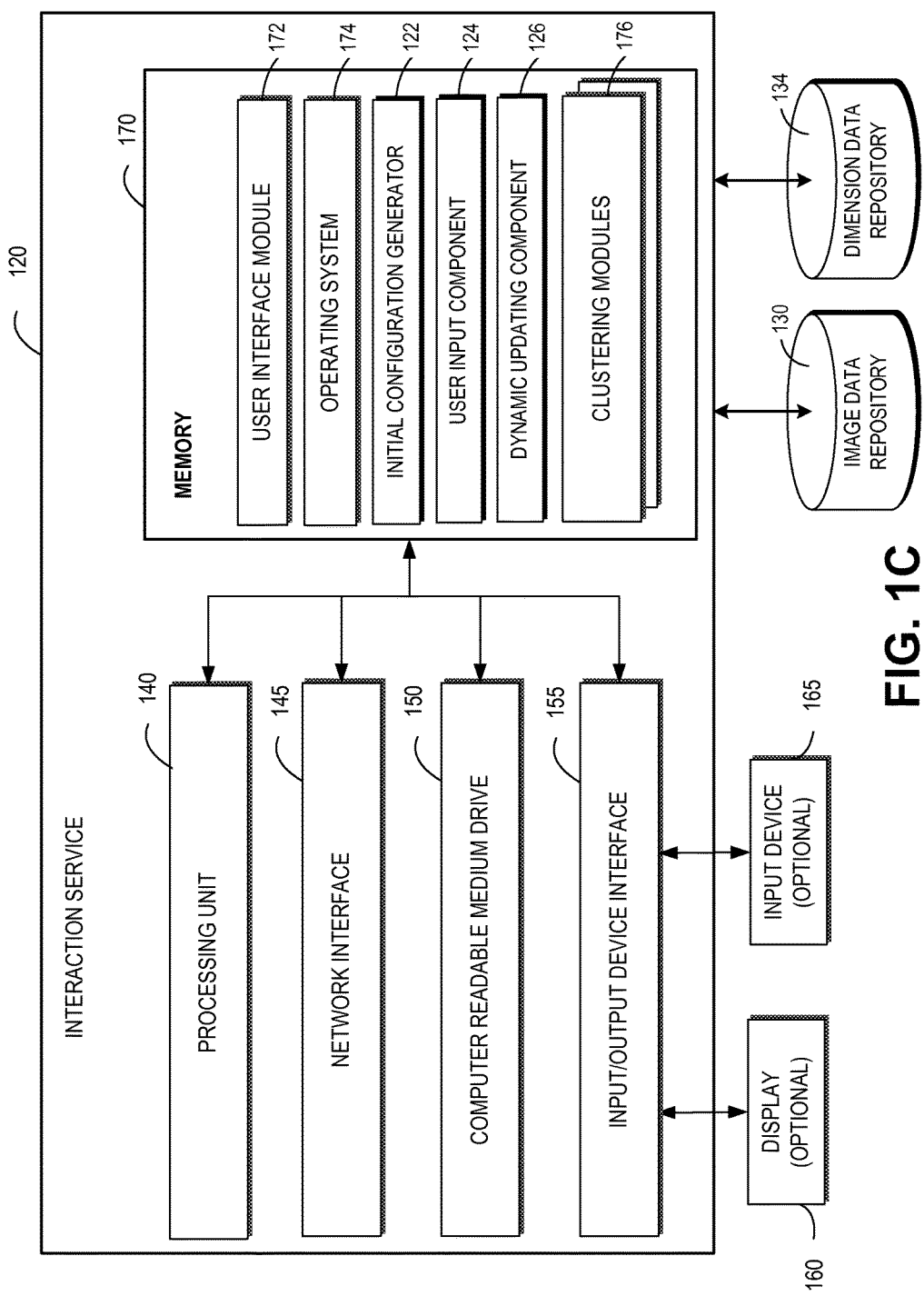
FIG. 1C depicts a general architecture of an example computing device providing an interaction service for efficient and interactive browsing of items and/or images.

FIG. 1C depicts a general architecture of a computing system (referenced as interaction service 120) that determines collections of items, generates an initial collection of items and/or images, and/or updates at least a portion of the initial collection based on user interaction with the initial collection. The general architecture of the interaction service 120 depicted in FIG. 1C includes an arrangement of computer hardware and software components that may be used to implement aspects of the present disclosure. The interaction service 120 may include many more (or fewer) elements than those shown in FIG. 1C. It is not necessary, however, that all of these generally conventional elements be shown in order to provide an enabling disclosure. As illustrated, the interaction service 120 includes a processing unit 140, a network interface 145, a computer readable medium drive 150, an input/output device interface 155, a display 160, and an input device 165, all of which may communicate with one another by way of a communication bus. The network interface 145 may provide connectivity to one or more networks or computing systems. The processing unit 140 may thus receive information and instructions from other computing systems or services via the network 108. The processing unit 140 may also communicate to and from memory 170 and further provide output information for an optional display 160 via the input/output device interface 155. The input/output device interface 155 may also accept input from the optional input device 165, such as a keyboard, mouse, digital pen, microphone, touch screen, gesture recognition system, voice recognition system, image recognition through an imaging device (which may capture eye, hand, head, body tracking data and/or placement), gamepad, accelerometer, gyroscope, or other input device known in the art.

The memory 170 may contain computer program instructions (grouped as modules or components in some embodiments) that the processing unit 140 executes in order to implement one or more embodiments. The memory 170 generally includes RAM, ROM and/or other persistent, auxiliary or non-transitory computer-readable media. The memory 170 may store an operating system 174 that provides computer program instructions for use by the processing unit 140 in the general administration and operation of the interaction service 120. The memory 170 may further include computer program instructions and other information for implementing aspects of the present disclosure. For example, in one embodiment, the memory 170 includes a user interface module 172 that generates user interfaces (and/or instructions therefor) for display upon a computing device, e.g., via a navigation interface such as a browser or application installed on the computing device. In addition, memory 170 may include or communicate with image data repository 130, dimension data repository 134 and/or one or more other data stores, as discussed above with reference to FIG. 1B.

In addition to and/or in combination with the user interface module 172, the memory 170 may include an initial configuration generator 122, a user input component 124 and a dynamic updating component 126 that may be executed by the processing unit 140. In one embodiment, the initial configuration generator 122, user input component 124, dynamic updating component 126, and clustering modules 176 individually or collectively implement various aspects of the present disclosure, e.g., determining collections of items, generating an initial collection of item images, analyzing user input with respect to the initial collection, dynamically updating the initial collection based on the user input, etc., as described further below. While the initial configuration generator 122, user input component 124, dynamic updating component 126 and clustering modules 176 are shown in FIG. 1C as part of the interaction service 120, in other embodiments, all or a portion of an initial configuration generator, a user input component, a dynamic updating component and/or one or more clustering modules 176 may be implemented by the retail server 110 and/or another computing device. For example, in certain embodiments of the present disclosure, the retail server 110 may include several components that operate similarly to the components illustrated as part of the interaction service 120, including a user interface module, initial configuration generator, user input component, dynamic updating component, one or more filter modules, processing unit, computer readable medium drive, etc. In such embodiments, the retail server 110 may communicate with an image data store, such as image data repository 130, and the interaction service 120 may not be needed in certain embodiments. Further, although certain examples are illustrated herein in the context of a retail server 110, this is not a limitation on the systems and methods described herein. It will also be appreciated that, in some embodiments, a user device may implement functionality that is otherwise described herein as being implemented by the elements and/or modules of the interaction service 120. For example, the user computing device 102 may receive code modules or other instructions from the retailer server 110 and/or interaction service 120 via the network 108 that are executed by the user computing device 102 to implement various aspects of the present disclosure.

Figure 2:
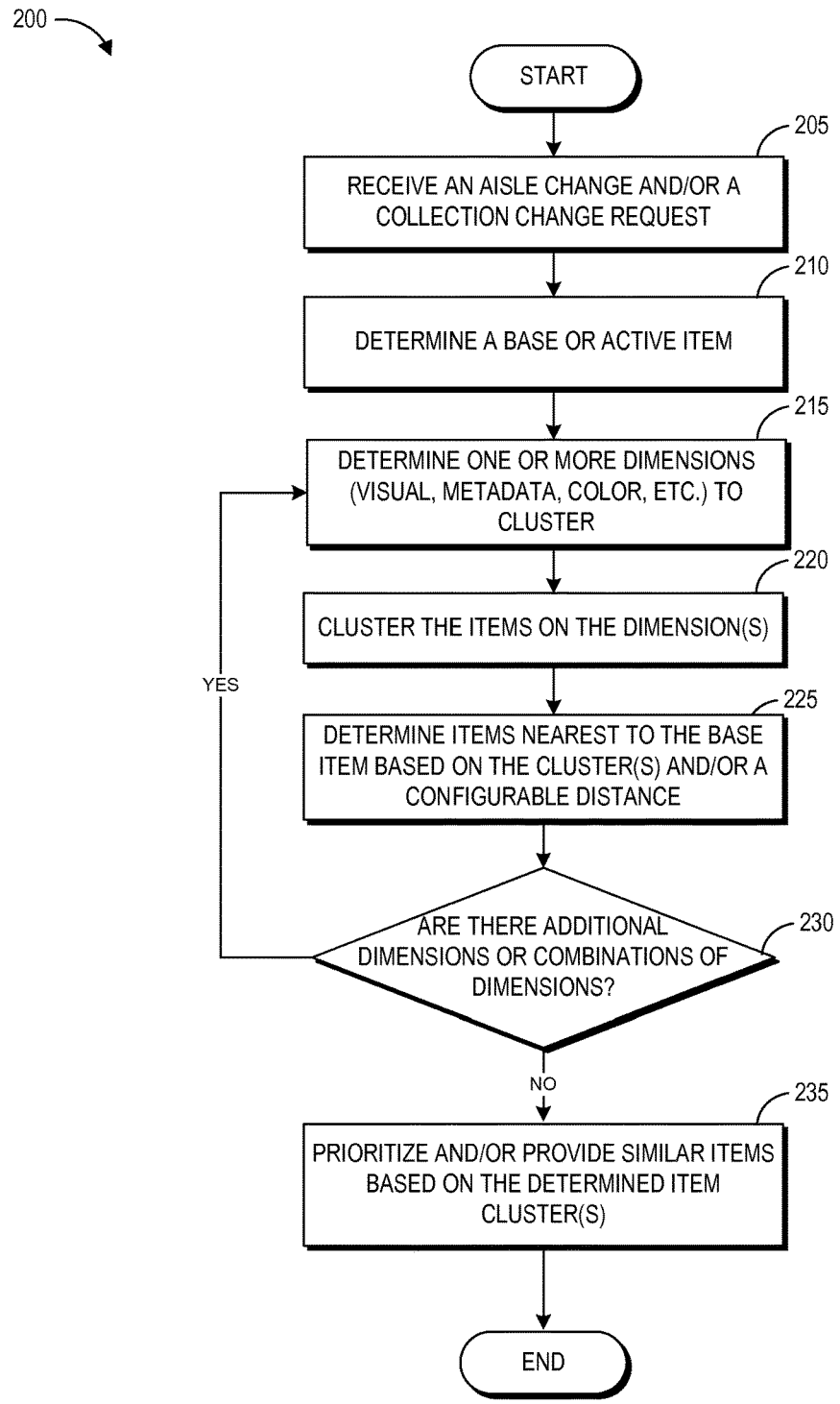
FIG. 2 is a flow diagram of an illustrative method implemented at least in part by an interaction service for determining a collection of similar items based on multidimensional clustering.

FIG. 2 is a flow diagram of an illustrative method 200 implemented at least in part by interaction service 120 for determining a collection of similar items based on multidimensional clustering. While the illustrative method will be described below as being implemented by the components of interaction service 120, in other embodiments, a similar method may be implemented by the retail server 110 or other computing system responsible for providing front-end communication with a user computing device. As discussed above, illustrative method 200 may be implemented entirely by a user device, such as user computing device 102, in some embodiments.

The illustrative method 200 begins at block 205, where interaction service 120 receives an aisle, collection, and/or set change request. Non-limiting examples of aisle change requests include the options of determining aisles by color, brand, length, pattern, more variety, less variety, the options and/or states corresponding to controls 184A-184D of FIG. 1A, 410A-410F of FIGS. 4A-4D, the illustrated options and/or states of FIG. 5, described above and below, and/or some combination thereof. In some embodiments, an aisle, set, and/or collection may be determined from a base item. For example, where an initial aisle and/or collection includes items {A, B, C}, an updated aisle and/or collection may include items {A, D, E}. In the example, item A may be the base item that interaction service 120 uses as a reference item from which to determine a similar collection and/or set of items, which is described further below. It will be appreciated that there may be similar items and/or intersections between two sets and/or collections (e.g., there may be a difference of one item between two sets of items). As used herein, an aisle change may also be referred to as "pivoting," which refers to determining a new collection of items based at least in part on a particular base item in an initial set of items. In some embodiments, it will be appreciated that interaction service 120 may determine items for a filter request, such as filtering a collection of items by color, length, pattern, and/or brand, for example, similar to the determination of items for an aisle change request. It will also be appreciated that, in some embodiments, while the below blocks are described after block 205, interaction service 120 may implement the functionality described with respect to one or more of the below blocks before implementing the functionality of block 205. For example, the interaction service 120 may determine one or more collections of items and/or clusters of items (as described below) before a particular aisle change request is received. In other words, collections and/or clusters of items may be pre-computed and/or cached before an aisle change request is received.

At block 210, interaction service 120 determines and/or selects a base, active, and/or principal item. For example, as illustrated in FIG. 1A, image 182 may correspond to the base, active, and/or principal item. The principal item may be determined based on an order of the items and/or images, such as the image that is presented in the front of the display. The principal item may additionally or alternatively be determined based on an attribute and/or property of the initial set and/or collection of items (attributes and properties may be referred to herein interchangeably as "attributes"). For example, the base item may be determined, received, and/or selected at random (e.g., a user selects an option for a "random" collection) or based on the most popular, highest rated, most purchased, and/or item with the most votes from a collection. In some embodiments, determination of the base, active, and/or principal item based on user interactions and/or input may correspond to illustrative method 300 described below. As described below, attribute and/or dimension values of the base and/or principal item may be used by interaction service 120 to determine similar items and/or new collections of items.

At block 215, interaction service 120 determines one or more dimensions and/or attributes for clustering. For example, interaction service 120 may determine the one or more dimensions and/or attributes based on the aisle change request and/or selected option. An aisle change request for "more like this" may correspond to all of the available dimensions and/or attributes (e.g., visual, color, metadata, purchase data, textual similarity, etc.) or to a preset selection of dimensions or attributes determined by a user or an operator of interaction service 120. The available dimensions and/or attributes may be retrieved from the dimension data repository 134. In another example, an aisle change request corresponding to filtering by color and/or brand may cause clustering by the color and/or brand dimensions, respectively. Interaction service 120 may retrieve previously selected options, such as two or more options that have been selected in a series, which may be used by interaction service 120 to chain and/or combine dimensions/attributes for clustering. In other words, browsing and/or aisle change requests may be "sticky," such that the interaction service 120 stores previous states for future filtering and/or aisle changes.

At block 220, interaction service 120 clusters the items based on the determined one or more dimensions. For each of the determined one or more dimensions, interaction service 120 may plot and/or graph each item by its particular attribute and/or dimension value. Interaction service 120 may then determine clusters and/or groups of items based on the attribute and/or dimension values. One or more models and/or algorithms known in the art may be used by interaction service 120 for determining clusters such as hierarchical clustering; centroid models such as the k-means algorithm; distribution based clustering; density based clustering; subspace clustering; latent space clustering; and/or graph-based models. Furthermore, it will be appreciated that supervised or semi-supervised machine learning may be implemented by the interaction service for determining clusters. In some embodiments, one advantage of unsupervised machine learning is that multidimensional clustering may automatically group and/or cluster items based on characteristics and/or correlations that have not been manually named or categorized by a human supervisor. One example algorithm for determining clusters may include the following: select n endpoint as initial centroid; until no more centroids change, form n clusters by assigning each point to its closest centroid, and compute the centroid for each cluster. In some embodiments, the number of clusters may be configurable, selected at random, and/or some combination thereof.

One or more techniques may be used by interaction service 120 for plotting and/or graphing dimensions and/or attributes, depending on the embodiment. For example, color similarity may be detected by clustering in multiple dimensions of a color graph based on hue, saturation, value, and/or other color properties. More information regarding extracting colors from an image may be found in U.S. patent application Ser. No. 14/316,483, filed Jun. 26, 2014, entitled "IMAGE-BASED COLOR PALETTE GENERATION," which is hereby incorporated herein by reference in its entirety. To determine visual similarity of items, interaction service 140 may implement one or more visual recognition and/or clustering techniques to cluster images and/or portions or fragments of images. Known visual recognition and/or imaging techniques that may be used for clustering include vector tracing, edge matching, a divide-and-conquer strategy, greyscale matching, gradient matching, feature-based models, and/or three-dimensional object recognition techniques. For example, image clustering techniques may group and/or cluster dresses and/or clothing of a particular pattern, shape, e.g., grouping of V-neck shirt items and/or images together. Text and/or metadata may also be clustered. For example, a k-means algorithm may be used to compare and/or plot text data by words and/or n-grams of the text.

In some embodiments, one or more dimensions and/or attributes may be plotted and/or graphed together to determine similarities among items and/or correlations among the dimensions and/or attributes. For example, visual characteristics, color, text, and/or metadata may be plotted together and/or clustered to determine similar items. For example, each axis may include a different dimension (e.g., visual, color, text, etc.), which may result in a multidimensional graph to cluster and/or correlate items. In some embodiments, multidimensional clustering and/or the use of two or more dimensions for clustering may correspond to the "more like this" user interface option described above and below.

At block 225, interaction service 120 determines items nearest to the base item based on relative distance and/or proximity to the base item. For example, if a V-neck shirt corresponds to the base item, then items corresponding to crew neck or turtleneck shirts may be relatively farther from the base item than other V-neck shirts. In some embodiments, a configurable distance may be used to determine a new collection and/or set of similar items. In other embodiments, there may be a threshold number of items for a set and/or collection, such as one thousand items, and/or the nearest items within the threshold number of items may be included in the set and/or new collection of items. In some embodiments, the clustering methods and/or techniques may be optimized by caching clustering results in the dimension data repository 134 and/or caching or prioritizing some computationally expensive calculations for clustering comparisons. For example, clusters may be retrieved from dimension data repository 134. In some embodiments, interaction service 120 may determine items nearest to the base item based on relative distance and/or proximity to the base item in the retrieved cluster.

In some embodiments, interaction service 120 may generate more variety in collections of items. Variety in collections of items may be desirable and/or items may be ordered by similarity and/or dissimilarity, as described below with reference to FIG. 4A. In some embodiments, providing variety in a collection of items may be desirable to enhance the user experience of browsing items and/or images. For example, if items become more diverse as a user browses, then the browsing experience may be one of discovery for the user. As such, instead of strictly returning the items closest to the base item, interaction service 120 may introduce some randomization and/or pseudo-randomization into the determination of collections of items to provide more variety. For example, for one or more items, such as every third, fourth, or n items, interaction service 120 may multiply one or more dimensions by a configurable factor, constant, and/or pseudo-randomized number. Other examples of randomization and/or pseudo-randomization may be the application of a sine function and/or some other periodic function, pseudo-randomly adding items to collections (e.g., adding items having a configurable and/or randomized distance for every n items or for a pseudo-random number of items), otherwise modifying the determination of collections of items to add variety, and/or some combination thereof. Thus, the addition of diverse items to a collection may be programmatically achieved by interaction service 120.

In some embodiments, interaction service 120 may further cluster items and/or determine collections of items based on user preferences, user data, data from a user data store, personalization data, and/or demographics data. For example, user interface 180 of FIG. 1A may include a "favorite," pin, and/or add-to-cart user interface control that allows a user to save, purchase, and/or indicate an item of interest. Interaction service 120 may store and/or use user preference data, such as saved, purchased, "liked," and/or items selected with the "more like this" option, to determine collections of items. For example, user preferences of items may be used to influence and/or determine distances of items based on items that a user has previously selected. In some embodiments, interaction service 120 may use personalization and/or user preferences of items to affect distance formulas in determining distances of items for clustering (e.g., weighting distances of items differently based on user data and/or history). Additionally or alternatively, user preferences and/or history may be used to train machine learning algorithms and/or result in semi-supervised machine learning. In some embodiments interaction service 120 may determine collections based on demographics data even if a user has not interacted with items and/or collections of items. For example, interaction service 120 may retrieve an age, location, gender, etc. of a user to determine collections of items. Other demographics data may include geographical region, ethnic group, religion, culture, language, and/or dialect. Similar to personalization data that may be used to enhance item clustering, demographics data may be used to enhance item clustering and/or determination of collections of items. In some embodiments, attributes and/or dimensions may include and/or be affected by user preferences, user data, personalization data, and/or demographics data. In other words, personalization and/or demographics data may be used to personalize and/or customize distance formulas for clustering of items.

At decision block 230, interaction service 120 may determine whether there are additional dimensions and/or attributes or combinations of dimensions and/or attributes for clustering. For example, if there are additional dimensions and/or combinations of dimensions to process, interaction service 120 may return to block 215 for additional clustering processing. In some embodiments, instead of a single multidimensional graph, interaction service 120 may graph and/or plot one dimension and/or some combination of dimensions at a time. Thus, as will be described below, a collection of similar items may be determined based on determining correlations between multiple clusters and/or graphs of items.

At block 235, a set and/or collection of items may be determined based on the determined one or more clusters. For example, if there is one cluster of items, then interaction service 120 may determine a set or collection of similar items based on the relative distance and/or proximity to the base item. In other examples, where multiple clusters of items are determined in separate graphs, interaction service 120 may prioritize and/or determine a collection of items based on the intersection of similar items among the multiple clusters and/or graphs or based on a threshold distance from the base item to other items in multiple graphs. In a simple example, where graph one includes a cluster of items {A, B, C, D, G}, and graph two includes a cluster of items {A, B, C, D, E, F}, the intersection of the clusters includes items {A, B, C, D}, which may be returned in or provided by interaction service 120.

While FIG. 2 has been described above with reference to an embodiment in which item collections are determined by interaction service 120, in other embodiments, all or a portion of collections of similar items may be determined by computing device 102. For example, executable code included in a page or associated with a user interface may, when executed by the computing device 102, cause the computing device 102 to retrieve, determine, and/or cause the display of items. As an example, a script or other executable code may be included in a page sent by the retail server 110 to the computing device 102 for display by a browser or other application executed by the computing device 102. Upon a user selection of a given selectable option within the page, the script or other executable code may cause the computing device 102 to generate and/or update the collection of the item images and/or aisles, as described herein.

Figure 3:
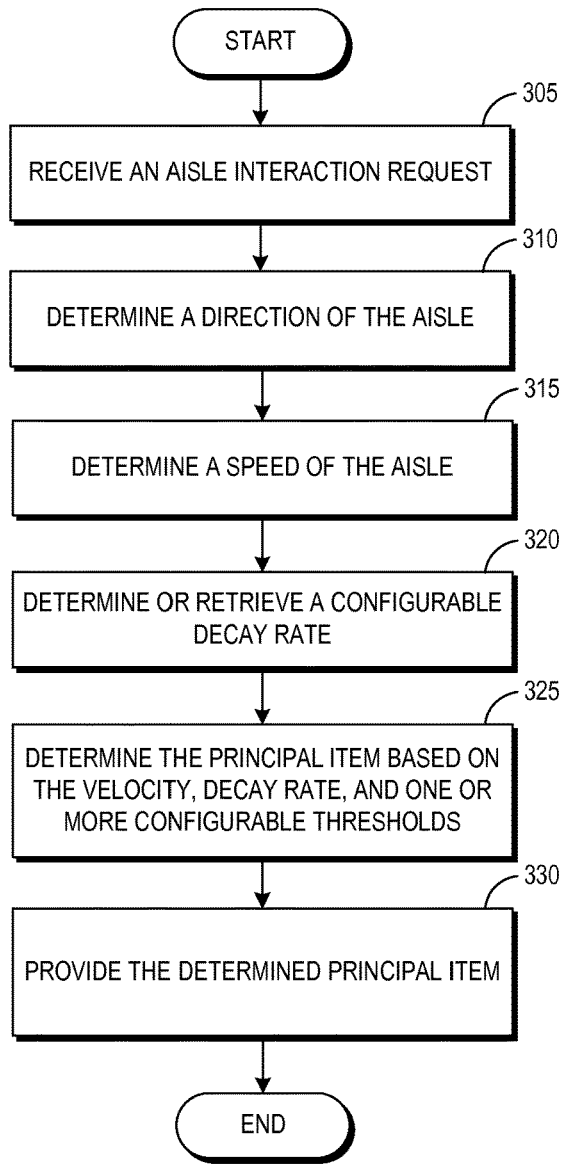
FIG. 3 is a flow diagram of an illustrative method implemented at least in part by an interaction service for determining a principal item and/or image.

FIG. 3 is a flow diagram of an illustrative method 300 implemented at least in part by the interaction service 120 for determining a principal item and/or image. While the illustrative method will be described below as being implemented by the components of interaction service 120, in other embodiments, a similar method may be implemented by the retail server 110 or other computing system responsible for providing front-end communication with a user computing device. As discussed above, illustrative method 300 may be implemented entirely by a user device, such as user computing device 102, in some embodiments.

Figure 7A:
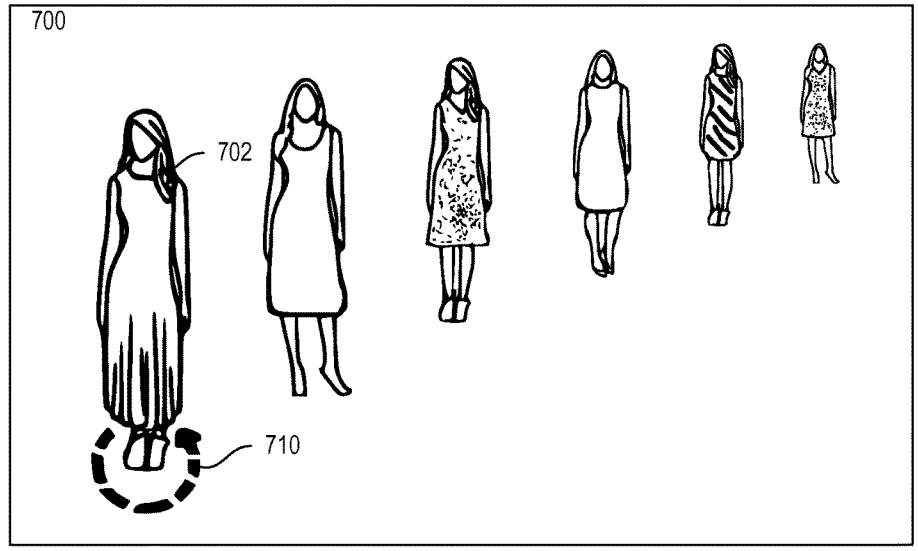
FIGS. 7A and 7B are pictorial diagrams illustrating example user interfaces generated at least in part by an interaction service following a determination of a principal item.

The illustrative method 300 begins at block 305, where interaction service 120 receives an aisle interaction request. The aisle interaction request may be based at least in part on user input and/or interaction. For example, as illustrated in FIG. 7A, described below, a user may interact with the user interface to update the interactive collection of item images, such as a swipe gesture or a selection of a user interface element, for example. The aisle interaction request may include data corresponding to and/or associated with the user input interaction. For example, the aisle interaction request may include data corresponding to touch user inputs, such as (x, y) coordinates, and/or movement data associated with user interactions, such as speed and/or directional data.

At block 310, interaction service 120 determines a direction based at least in part on the aisle interaction request. For example, interaction service 120 may determine that the aisle should generally move to the left based on a swipe gesture that is generally from the left to the right or vice versa. In the swipe example, a direction may be calculated and/or determined based on two reference points, such as a start and ending position. In some embodiments, other user input interactions such as a position or movement of user computing device 102 and/or image recognition of body parts such as a head tilt may be used by interaction service 120 to determine direction. Interaction service 120 may determine a direction to the right based at least in part on a swipe gesture that is generally from the right to left or vice versa. In some embodiments, the aisle user interface configuration may generally operate as a carrousel, which may allow a user to browse the collection of item images in multiple directions.

At block 315, interaction service 120 determines a relative speed based at least in part on the aisle interaction request. For example, the aisle interaction request may correspond to a swipe and/or other user input interaction and interaction service 120 may determine a degree and/or relative speed data associated with the user input interaction. In the swipe example, a swipe user input interaction may start at point A and end at point B. The relative difference between point A and point B may be used by interaction service 120 to determine the relative speed of the aisle change, alone or in combination with the time length of the swipe and/or other factors. For other user input interactions, such as a head tilt and/or positioning of user computing device 102, the degree of the tilt and/or positioning may be used at least in part to determine a relative speed. For example, a tilt of thirty degrees of user computing device 102 may cause a faster speed aisle change than a tilt of ten degrees. Similarly, a relative intensity, angle, distance and/or speed of a tilt, rotation or movement of a user's physical computing device itself (such as a phone or tablet device) may be considered in determining the speed of the aisle.

At block 320, interaction service 120 may determine and/or retrieve a configurable decay rate. In some embodiments, interaction service 120 may determine that the aisle change and/or update of the presented item images of the collection should stop and/or appear to "snap" on a principal item image. As such, the aisle change may slow based on a configurable decay rate. The configurable decay rate may be retrieved from a data repository. Example decay rates include an exponential decay rate, such as half-life (e.g., $t=\ln(2)/\text{constant}$), linear decay, and/or decay of fifty percent every one hundred milliseconds, for example.

At block 325, interaction service 120 determines the principle item based on the determined direction and speed (e.g., velocity), decay rate, and/or one or more configurable thresholds. Interaction service 120 may determine and/or retrieve the currently presented item images and/or items in the collection or aisle. For example, the user interface may present a subset of the items in the collection such as five, six, seven, etc., item images based on the display of user computing device 102 and/or the embodiment. However, the number of items in the collection may include more item images than currently being presented, for example, one hundred or one thousand items. The collection of items may be ordered and/or may correspond to an ordered data structure such as a linked list or an array.

A position such as an (x, y) coordinate may be determined for item images corresponding to the items in the collection. Interaction service 120 may determine a principal item image based on the direction, speed, and decay rate. For example, an iterative loop may be used, where the loop repeats until one or more thresholds are reached or exceeded. The loop may include, in some embodiments: calculating an (x, y) coordinate for each item image; updating the coordinate for each item image by the calculated velocity; updating the velocity by the decay rate; and repeating the loop until the velocity is below a particular threshold, which may be configurable. In some embodiments, the loop may be optimized to calculate positions for item images within a window. In other words, where only five images are displayed at a time, interaction service 120 may calculate positions for seven to ten images at a time (accounting for additional images that may be presented following movement). Furthermore, interaction service 120 may determine whether an item image in a designated and/or threshold area of the user interface (such as the area furthest to the left, right, top, bottom, or an area specified by (x,y) coordinates, etc.) is the principle item image if more than a configurable percentage of the image would be displayed in the designated and/or threshold area. For example, if more than fifty percent of the item image would no longer be displayed in the user interface display area, then the item image will be removed from the user interface display area by interaction service 120. Thus, interaction service 120 may determine that the next item image in the collection may become the principle item image and/or the user interface may "snap" to the determined principle item image. In some embodiments, the principle item image may be partially displayed in the user interface and then "snap" to fully display the principle item image in the user interface. In other words, interaction service 120 and/or user interface may be configured such that once the animation corresponding to the aisle interaction request stops there are no partially represented item images, such as the display of only part of an item image in the display of computing device 102. Thus, interaction service 120 determines the principle item, which may be used to update the user interface.

At block 330, interaction service 120 provides the determined principle item. In some embodiments, the principle item may be provided to the dynamic updating component 126, which may update the user interface to animate item images in response to the user input interaction. Additionally, as described below, the user interface may present additional information associated with the principal item, such as displaying a video corresponding to the principle item, additional views, and/or additional details or summary data regarding the principle item.

Figure 4A:
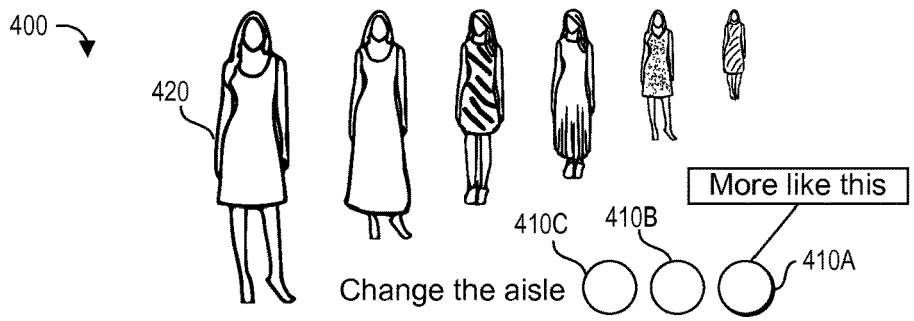
FIGS. 4A-4D are pictorial diagrams depicting an example sequence of partial user interface representations illustrating transitions between display of different collections of items and/or image animations.

FIGS. 4A-4D depict an example sequence of partial user interface representations 400 illustrating transitions between display of different collections of items and/or images. The initial configuration and/or collection of items as illustrated in FIG. 4A includes a number of item images in an arrangement. Illustrative user interface 400 includes aisle change and/or filter options 410-410C. A user may cause an "aisle change" based on user selection of one of aisle change options 410A-410C. For example, a user selection of aisle change option 410A, a "more like this" option, may cause the interaction service 120 to determine a collection of items based on the principle item associated with item image 420, such as using the methods and/or techniques described above with reference to illustrative method 200. In some embodiments, the principle item image and/or the item image in front does not change, but the rest of the aisle item images change and/or animate. As described herein, examples of changing aisles and/or pivoting on an item include determining items similar to the principle item based on one or more attributes and/or dimensions.

In some embodiments, items and/or images may be presented in an order corresponding to similarity or dissimilarity with the principle item and/or image. For example, as described above with reference to illustrative method 200, items in the collection may be determined based on a distance from a base and/or principle item. As such, images presented in user interface 400 may be ordered and/or sorted based on a similarity and or distance from the principle item image 420. As illustrated, images presented in user interface 400 may be ordered from closest distance and/or similarity to farthest from the principle item image 420. Thus, a user interaction to scroll and/or browse the item images may result in presentation of item images with more variety and/or farther distance from principle item image 420. In some embodiments, this approach may be advantageous to enhance the user browsing experience and/or allow a user to view more diverse items through directional browsing.

Figure 4B:
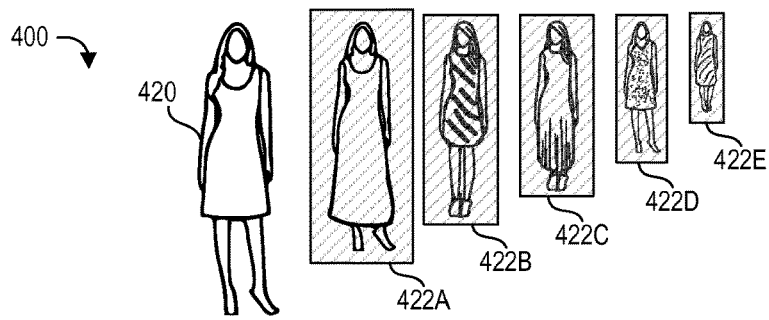

As illustrated in FIG. 4B, one or more item images may animate and/or change based on user selection of one or more options. For example, display of the image animations and/or transitions illustrated in FIG. 4B may be caused by user selection of the "more like this" option 410A in FIG. 4A. In the example, image 420 may correspond to and/or represent the principle item. As such, the interaction service 120 may determine items that are similar to the principle item image 420 based on multiple attributes and/or dimensions, based on the methods described above. Once determined, user interface 400 may be updated to include the new item images and/or collection. Animations and/or transitions 422A-422E may include fading out and/or transitioning in a particular order. One example includes the fading out of item images 422A, 422B, 422C, 422D, and 422E, in that respective order. Other non-limiting examples of transitions and/or animations include the fading out of item images from back to front (e.g., 422E, 422D, 422C, and so on, in that respective order), video animations of item images fading in a lateral direction, video animations of models walking off, other animations or transitions to illustrate images and/or a collection changing, and/or some combination thereof.

Figure 4C:
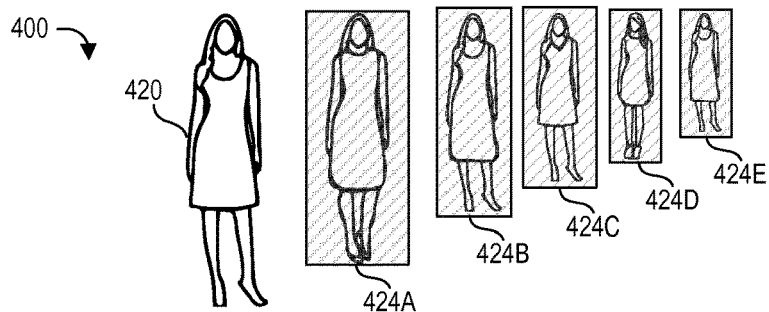

As illustrated in FIG. 4C, one or more item images may animate and/or change to new item images and/or collections. For example, animations and/or transitions 424A-424E may include fading in and/or transitioning in a particular order. One example includes the fading in of item images 424E, 424D, 424C, 424B and 424A, in that respective order. In some embodiments, animations and/or transitions 424A-424E may correspond, correlate, and/or be similar to animations and/or transitions 422A-422E of FIG. 4B. For example, where animations and/or transitions of FIG. 4B include the fading out of images from front to back, the animations and/or transitions of FIG. 4C may include the fading in of images from front to back.

Figure 4D:
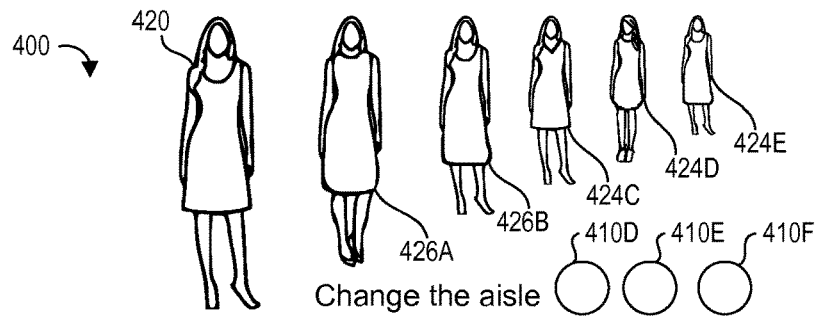

As illustrated in FIG. 4D, new item images and/or collections may be presented to the user after completion of one or more visual transitions or other effects described above with respect to FIGS. 4B and 4C. For example, new item images 426A-426E may be presented in a user interface 400 as a result of user selection of the "more like this" option 410A. In the example, item images 426A-426E and/or corresponding items may be determined based on one or more dimensions and/or attributes of similarity with the principle item image 420 and/or corresponding item, as described above. As illustrated, item image 420 and some of item images 426A-426E may be similar with respect to color, length, pattern, text description, other attributes and/or dimensions, and/or some combination thereof.

In some embodiments, instead of a complete aisle change of the displayed items other than the principal item, some of the item images in the aisle may be filtered based on one or more attributes and/or dimensions. For example, if a user selects a "similar color" option or a "red" option, then item images that are red may remain in the aisle while non-red item images may be filtered out. With reference to FIG. 4B, the item images corresponding to animations 422B, 422D, and 422E may fade out, and while not illustrated, the item images corresponding to animations 422A and 422C may remain because they match the filter criteria. In some embodiments, a visual transition may present the remaining items as "moving up" in the aisle to fill empty spaces, potentially resulting in the addition of one or more new items at the back of the aisle. Filtering may be accomplished by the methods and/or techniques described above with reference to illustrative method 200. More information regarding filtering and/or sorting of items and/or images, which may be combined with the multidimensional clustering techniques described herein, may be found in the '607 Application.

Figure 5:
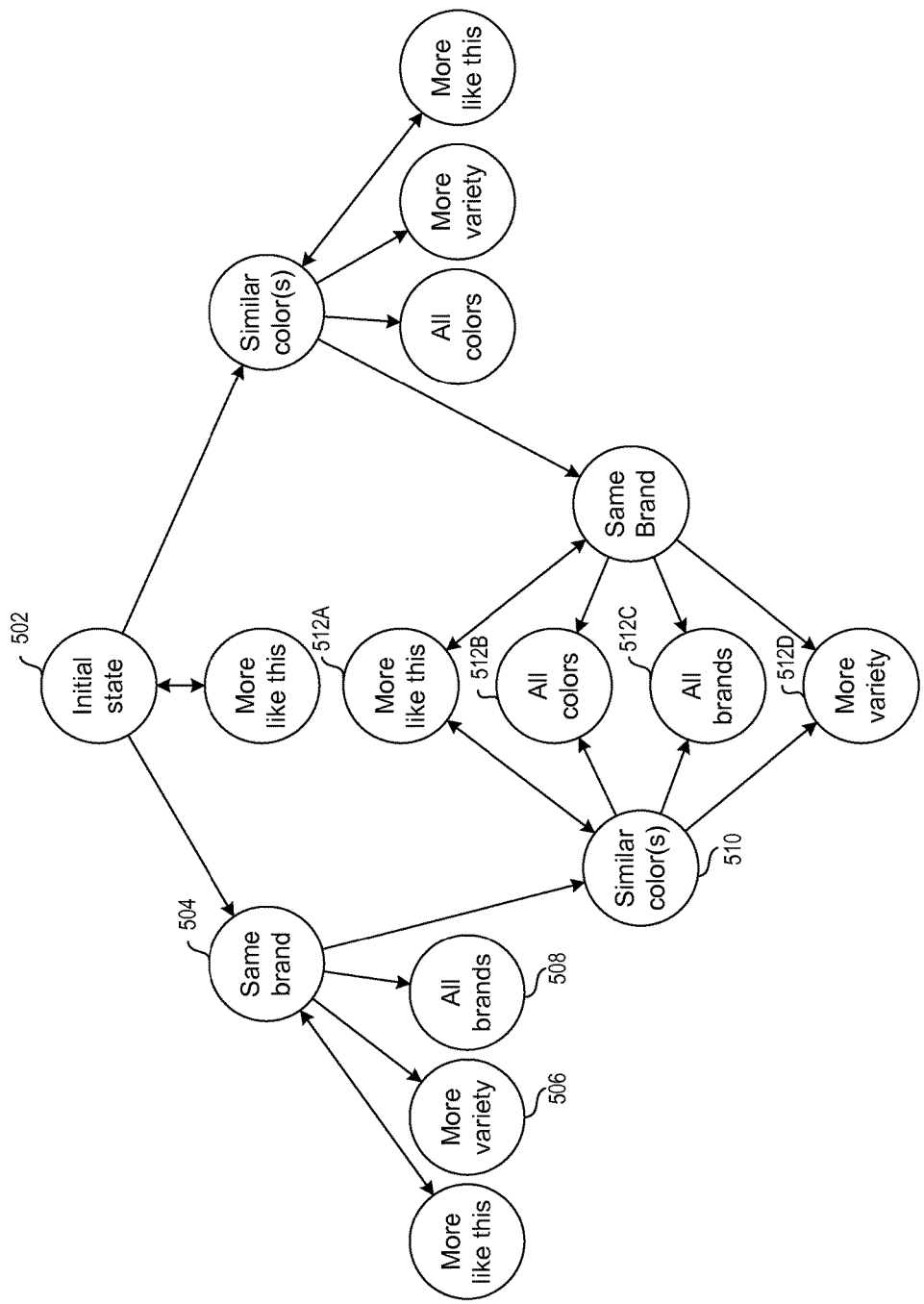
FIG. 5 is an example state diagram depicting different states of a current collection of items based on user selections of one or more attributes and/or dimensions.

FIG. 5 is an illustrative state diagram depicting different states of a current collection of items based on user selections of one or more attributes and/or dimensions. As illustrated, a collection of items and/or an aisle may begin at initial state 502. For example, initial state 502 may correspond to the items and/or images of user interface 180 of FIG. 1A. The illustrative states of FIG. 5 may correspond to the options and/or user interface controls in FIGS. 1A and/or 4A-4D. Furthermore, the collections of items and/or images corresponding to the states of FIG. 5 may be determined by the methods and/or techniques described above with reference to illustrative method 200. The illustrated states are examples and different states may be available in different embodiments. For example, in some embodiments, a slider element may be provided in a user interface that allows a user to select a state based on a gradient and/or scale (e.g., a user may update a collection by interacting with a slider element where the opposite ends are "more like this" and "more variety"). Other example states (not illustrated) may include a "complementary color" state, a "same color/brand/style" state, and/or others. Furthermore, the illustrative state diagram may not represent every available state. For example, state 506 may have additional states available from it, which are not illustrated. In some embodiments, the "more like this" option and/or state may always be available. As described above, the "more like this" option may determine a collection of similar items based on two or more and/or all of the available dimensions and/or attributes for an item.

One example flow and/or series of states for collections and/or aisles may transition from initial state 502 to the "same brand" state 504. In the example, items may be filtered by brand (e.g., the source, creator, seller, and/or manufacturer of the item). Subsequent user selection may cause a transition from state 504 to a "similar color(s)" state 510. In some embodiments, selections from state 504 to state 510 may cause filtering and/or determination of a new collection based on brand and color attributes and/or dimensions. In other words, a user may chain and/or combine aisle changes and/or filters. Other subsequent user selections may cause a transition from state 504 to a "more variety" state 506 and/or "all brands" state 508. In some embodiments, states 506 and 508 may be similar to undo the "same brand" state 504 and/or to determine similar items based on all of the available dimensions and/or attributes for an item. The illustrative state diagram may also represent that particular states, such as states 512A, 512B, 512C and/or 512D, may be achieved and/or reached through multiple paths and/or directions. For example, user selections to filter and/or change aisles by brand and then color, and/or vice versa, may achieve the same state and/or corresponding collection of items despite the order of user selection. In some embodiments, the order of selected states may result in different collections of items. Furthermore, interaction service 120 may store the history of state and/or user selections. As such, a user may be able to undo and/or "backtrack" one or more state selections. For example, a user may filter by brand, filter by color, undo the filter by color, and then undo the filter by brand, in that respective order.

In some embodiments, interaction service 120 and/or user interface module 172 may provide a user interface that presents a visual representation and/or history of state selections by a user. For example, a user interaction with user interface 180 of FIG. 1A, such as a swipe down, may cause the user interface to present the history of a user's state selections (not illustrated). In some embodiments, a user may select a previous state in the history user interface to "backtrack" to a previous state. In other words, a history and/or a series of state selections similar to the states illustrated in FIG. 5 may be visually presented to a user in a user interface (e.g., a user interface including visual representations of states connected by lines). In some embodiments, the presentation of a user's pivot and/or state selection history may be presented in a tree view, which may present all and/or a part of a user's state selections including undo and/or backtrack actions.

FIGS. 6A-6D depict another example sequence of partial user interface representations illustrating the identification of a principal item image based on user interaction with an interactive collection of item images. User interface 600 may be similar to user interface 180 of FIG. 1A and user interface 400 of FIGS. 4A, 4B, 4C and/or 4D in many respects and/or may contain similar features. For example, user interface 600 may include a collection of item images in a perspective view, which may be similar to the collections of item images in a perspective view in FIGS. 1A and 4A-4D. User interface 600 and/or interaction service 120 may be configured to receive user input such as user input interaction 610. User input interaction 610 may occur via one or more input instruments such as a finger, mouse (such as a click or double-click), combination of fingers for a multitouch gesture in some embodiments, image recognition (e.g., recognition of a head tilt, eye tracking recognition, gaze detection, etc.), device positioning (e.g., tilting a device), and/or some combination thereof. In some embodiments, user input interaction 610 may be an interaction other than the illustrated swipe and/or touch gesture. User input interaction 610 may be received by user input component 124.

Figure 6A:
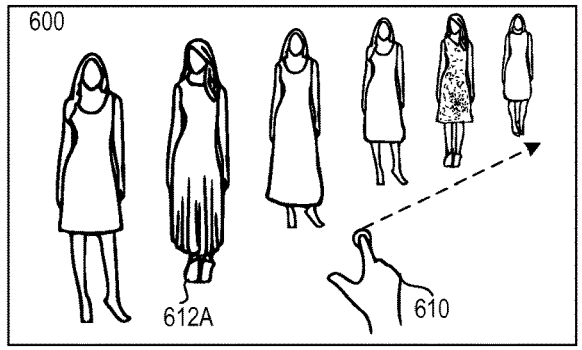
FIGS. 6A-6D are pictorial diagrams depicting an example sequence of partial user interface representations illustrating the identification of a principal item image based on user interaction with an interactive collection of item images.
Figure 6B:
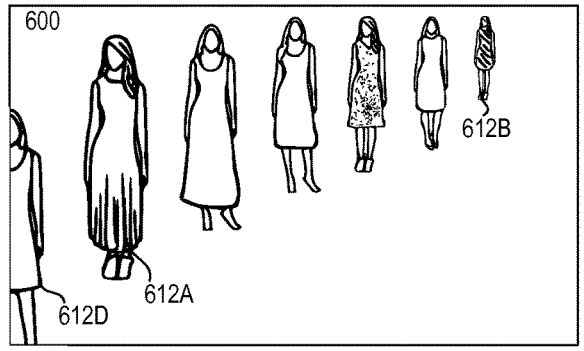

As illustrated in FIG. 6B, the aisle and/or interactive collection of item images may update in response to user input interaction 610 of FIG. 6A. For example, interaction service 120 may determine an updated principal item image in response to user input interaction 610. In some embodiments, the relative distance and/or degree of user input interaction 610 may cause the presented item images to update differently and/or to determine a different principal item image, as described above with reference to illustrative method 300. Item image 612B, which may be part of the current collection, may fade in and/or have a corresponding animation to present item image 612B that was not previously presented in FIG. 6A. Some item images, such as item image 612D, may be removed and/or partially removed from user interface 600. Furthermore, item images may animate and/or change position, such as item image 612A that has a different position in FIG. 6A as compared to FIG. 6B. Ultimately, as described herein, user interface 600 may present a runway-like view that corresponds to a flow of item images in a general left to right and/or right to left manner to a user. In some embodiments, item images may move and/or animate in a general top to bottom and/or bottom to top manner, or may move and/or animate at any another angle or degree.

Figure 6C:
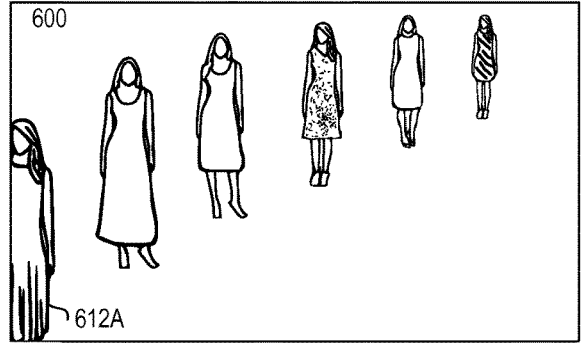

As illustrated in FIG. 6C, the aisle and/or interactive collection of item images may update further in response to the user input interaction 610 of FIG. 6A. For example, item image 612A may further change in position and/or be partially displayed in user interface 600. Also, item image 612A may further update and/or change in relative size. In some embodiments, as the interactive collection moves and/or animates, item images may enlarge and/or reduce in relative size.

Figure 6D:
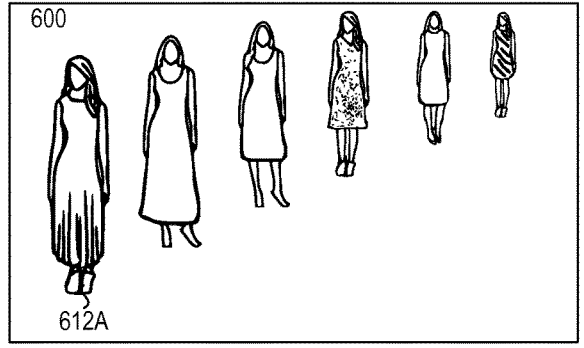

As illustrated in FIG. 6D, the aisle and/or interactive collection of item images may "snap" and/or focus on the principle item image based on user input interaction 610 of FIG. 6A. As described above, interaction service 120 may have determined item image 612A to be the principal item image. Therefore, item image 612A may be presented fully after being partially displayed. Furthermore, item image 612A may be presented as the largest item image relative to the other currently presented item images of the user interface 600 and/or may otherwise be highlighted by user interface 600 (e.g., presenting item image 612A ahead and/or in front of other item images). Additionally, in some embodiments, interaction service 120 may sort the currently presented item images based on a user selection, which may be used to determine the principal item image. More information regarding sorting of item images, which may be used for determining principal images, may be found in the '607 Application.

As illustrated in FIGS. 6A-6D, the aisle and/or interactive collection of item images may effectively display more information to the user than many alternative visual arrangements. For example, one item image may be presented to the user as the largest item image relative to the other item images (see item image 612A of FIG. 6D). Presentation of one item image as the largest may be advantageous to highlight and/or present details of one particular item to the user. Furthermore, presentation of other item images in a relative decreasing and/or diminishing size may allow the maximum number of item images to be presented to a user that the user can visually scan in a meaningful way. Effectively, multiple zoom and/or image size levels are presented at once to the user. As illustrated in FIGS. 6A-6D, user interaction to browse and/or scroll through the collection of item images zooms or minimizes each item image. Accordingly, interactive collection of item images arranged and navigated according to aspects of the present disclosure may provide a more efficient pan and/or zoom model for viewing and/or browsing multiple item images at once than existing alternatives.

In some embodiments, interaction service 120 and/or a user interface may support multiple user input and/or interaction types. For example, interaction service 120 may support facial recognition, head tilt, and touch input. Additionally, interaction service 120 may be able to seamlessly receive and/or resolve conflicts between multiple user input and/or interaction types from the same user. Interaction service 120 may designate a user input and/or interaction type as a primary input type and other user input and/or interaction types as secondary. In some embodiments, the primary user input and/or interaction type may be prioritized over secondary user input and/or interaction types. For example, where touch input is the primary user input type, interaction service 120 may respond to touch input over secondary input types such as head tilt and/or facial recognition. In the same example, if a user is navigating and/or browsing the aisle with a head tilt user interaction, then a subsequent user interaction of a touch and/or swipe may override the head tilt user interaction. Interaction service 120 may ignore secondary input until the secondary input exceeds a threshold. For example, a user may continue navigating and/or browsing the aisle with a head tilt user interaction (after head tilt has been overridden by a touch gesture) if the head tilt user interaction surpasses and/or exceeds a configurable threshold, such as ten or fifteen degrees, even though head tilt is a secondary input type. In this manner, primary and secondary input types may be used advantageously to resolve conflicts between multiple user input and/or interaction types. In some embodiments, the primary and secondary input types may be configurable.

In some embodiments, interaction service 120 may support eye and/or gaze detection for browsing the aisle and/or interactive collection of item images. For example, interaction service 120 may detect and/or receive user input associated with a user focusing and/or looking at a particular item and/or image. In response to the eye detection input, interaction service 120 may slow the speed of the aisle, "snap" on the focused item, and/or otherwise cause an update to the user interface as described herein. For example, as described above with reference to illustrative method 200 and/or user interface 400, interaction service 120 may determine and/or present items similar to the detected focus item and/or principal item. In some embodiments, eye and/or gaze detection may be one input of multiple user inputs and/or interaction types, as described above.

Figure 7B:
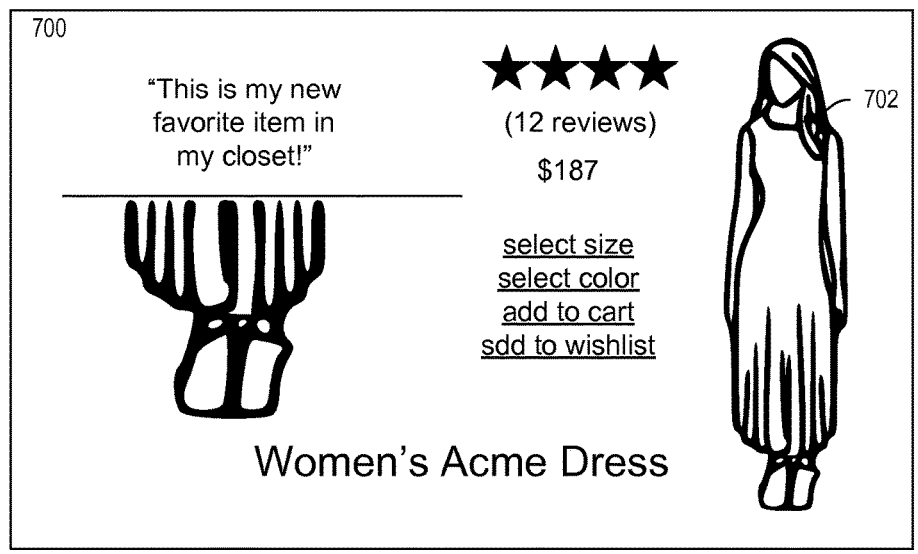

FIGS. 7A and 7B illustrate example user interfaces generated at least in part by interaction service 120 following a determination of a principal item. User interface 700 of FIG. 7A may be similar to user interface 600 of FIGS. 6A-6D in many respects and/or may contain similar features. Furthermore, user interface 700 may be presented following the determination of a principal item image shown in FIG. 6D or principal item image 702. For example, user interface 700 may include animation and/or video 710, which may include a representation of a model corresponding to principal item image 702 walking in a circle. Some advantages of animation and/or video 710 may include showing additional perspectives of principal item image 702 and/or bringing the attention of the user to the item corresponding to principal item image 702. Interaction service 120 may initiate animation 710 after a detection of and/or determination of a pause in user input and/or interaction (e.g., thirty seconds without user input and/or interaction and/or since the last received user input and/or interaction). In some embodiments, whether there are animations and/or the thresholds for animations may be configurable and/or based on user preferences.

FIG. 7B illustrates another example user interface generated at least in part by interaction service 120 following a determination of a principal item. For example, interaction service 120 may display additional details, views, and/or information regarding principle item image 702 after a pause in user input and/or interaction as described above. A benefit of the approach of providing videos and/or additional views after a pause in user interaction is that it may remove the need to display details for every item and/or image in the aisle. In some embodiments, this approach reduces clutter in the user interface and/or provides a minimalist user interface. In some embodiments, a hover, tap, swipe, and/or other selection of an item image may display greater details corresponding to the item and/or item image. For example, user selection of item image 702 may result in the display of additional details shown in user interface 700 of FIG. 7B. In some embodiments, a swipe user interaction, such as an up and/or down swipe, with user interface 700 of FIG. 7A may cause an animation associated with the display of additional details associated with item image 702. For example, item image 702 may remain in place while the other item images fade out and/or are replaced by item information similar to the item information illustrated in FIG. 7B. Details and/or information may include a larger item image, additional item images, an item title, user ratings, and/or any other attribute or property associated with the item. In some embodiments, the item image 702 may visually move (such as to the right) in order to make room for the additional information within the user interface, then visually move back to its previous position in the aisle upon a user request to close or minimize the additional information. In some embodiments, user interface 700 and/or parts of user interface 700 may correspond to the item detail page and/or display described above.

Although the image representations described herein are generally discussed in the context of a two-dimensional graphics and/or images, it will be appreciated that the determination of item collections and/or principal item images can be applied to images displayed within a three-dimensional image space as well. For example, some systems may display three-dimensional representations of items or other objects to users on a two-dimensional display. Other systems may display three-dimensional representations of objects using a volumetric display, for example, a stereoscopic, autostereoscopic, or multiscopic display. The data units of the three-dimensional images can be represented by one or more of voxels, polygons, or points within a point-cloud.

While image representations described herein are generally discussed in the context of full-sized images, it will be appreciated that reduced sized images may be used. A reduced representation of the image generated by cropping and/or scaling image data from at least one side of the image is sometimes referred to herein as a "slice" or "reduced representation" of an image. In some embodiments, a reduced representation can be produced by both cropping image data from at least one side of the image as well as scaling the cropped image. In some embodiments, an interactive configuration and/or collection may be configured to rotate through a carousel of image slices based on the user input. More information regarding generating and presenting a slice of an image may be found in U.S. patent application Ser. No. 14/223,960, filed Mar. 24, 2014, entitled "EFFICIENT AND INTERACTIVE PRESENTATION OF ITEM IMAGES," which is hereby incorporated herein by reference in its entirety.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for presenting a plurality of images, the system comprising:
    an electronic data store configured to at least store a plurality of images, wherein each image of the plurality of images is associated with a respective item from a plurality of items; and
    a computing system comprising one or more hardware computing devices executing specific computer-executable instructions, said computing system in communication with the electronic data store and configured to at least:
        cause rendering of a user interface that presents at least a first image and a second image from a first set of images for a first set of items, the first image and the second image presented in the user interface in a perspective view substantially following a line or arc, wherein the second image is rendered at a first position in the user interface;
        receive a first user initiated request to browse the first set of items, wherein the first user initiated request is generated in response to a first user interaction with the user interface;
        determine a velocity to move at least the second image from the first position in the user interface based at least in part on the user interaction;
        in response to the first user initiated request:
            determine a second position at which to present the second image based at least in part on the velocity, the first position of the second image, and a deceleration rate;
            cause rendering of a first updated user interface that presents the second image at the second position;
            determine a third position at which to present the second image based at least in part on a determination that the second position of the second image is within a threshold area;
            designate the second image at the third position as a principal image; and
            cause rendering of the second updated user interface that includes the second image at the third position as the principal image, wherein the entire second image is presented as a presented largest image in the second updated user interfaces;
        receive a second user initiated request for an item set change, wherein the second user initiated request is generated in response to a second user interaction with the second updated user interface;
        determine a dimension based at least in part on the second user initiated request, wherein the dimension comprises text data for a principal item associated with the principal image;
        generate a cluster of the plurality of items according to the dimension and a respective text value associated with each item of the plurality of items;
        determine a second set of items, from the cluster, according to a distance between the principal item and at least one other item from the cluster;
        determine a second set of images associated with the second set of items; and
        cause rendering of a third updated user interface that includes at least two images from the second set of images, wherein at least one image from the second set of images is not included in the second updated user interface.

2. The system of claim 1, wherein the computing system is further configured to at least:
    cause display of an animation associated with the second image in the second updated user interface based at least in part on a determination that a configurable amount of time has elapsed without user interaction with the second updated user interface.

3. The system of claim 1, wherein the computing system is further configured to at least:
    remove the first image from the second updated user interface.

4. The system of claim 1, wherein the third position of the second image in the second updated user interface matches a position of the first image in the user interface.

5. A system comprising:
    an electronic data store configured to at least store a plurality of images, wherein each image of the plurality of images is associated with a respective item from a plurality of items; and
    a computing system comprising one or more hardware computing devices executing specific computer-executable instructions, said computing system in communication with the electronic data store and configured to at least:
        cause display of a user interface that presents at least two images from a first set of images for a first set of items in a perspective view;
        receive a first user initiated request to browse the first set of items;
        determine a velocity to move at least a first image from the first set of images in the user interface based at least in part on the first user initiated request;
        determine a first position in the user interface of the first image;
        determine a second position at which to present the first image based at least in part on the determined velocity, the first position, and a deceleration rate, wherein the first image is to be partially presented in the user interface at the second position;
        in response to first user initiated request:
            cause display of a first updated user interface that partially presents the first image at the second position, wherein at least one image that was presented in the user interface is not presented in the first updated user interface;
            designate the first image as a principal image based at least in part on a determination that the second position is within a threshold area; and
            cause display of a second updated user interface that presents at least the first image, wherein the first image is fully presented in the second updated user interface based at least in part on the designation of the first image as the principal image;
receive a second user initiated request for an item set change, wherein the second user initiated request is generated in response to a second user interaction with the second updated user interface;
determine a dimension based at least in part on the second user initiated request;
generate a cluster of the plurality of items according to the dimension and a respective value associated with each item of the plurality of items, wherein the plurality of items comprise a principal item associated with the principal image;
determine a second set of items, from the cluster, according to a distance between the principal item and at least one other item from the cluster;
determine a second set of images associated with the second set of items; and
cause display of a third updated user interface that includes at least two images from the second set of images, wherein at least one image from the second set of images is not included in the second updated user interface.

6. The system of claim 5, wherein the computing system is further configured to at least:
cause display of additional information associated with the first image in the second updated user interface based at least in part on a determination that a configurable amount of time has elapsed time without user interaction with the second updated user interface, wherein the additional information associated with the first image is based at least in part on the designation of the first image as the principal image.

7. The system of claim 5, wherein the deceleration rate comprises at least one of an exponential decay rate, a linear decay rate, or a half-life decay rate.

8. The system of claim 5, wherein the perspective view of the presentation of the at least two images from the first set of images substantially follows a line or arc.

9. The system of claim 5, wherein the first image is selectable to cause display of additional data associated with the first image in the second updated user interface.

10. The system of claim 5, wherein the computing system is further configured to at least:
receive a third user initiated request to further browse items; and
cause display of a third updated user interface that presents at least a second image from the second set of images, and wherein the second image is not presented in the second updated user interface.

11. The system of claim 10, wherein the first user initiated request is associated with a primary user interaction type, wherein the third user initiated request is associated with a secondary user interaction type, and wherein display of the third updated user interface is further based at least in part on the third user initiated request being associated with a data value exceeding an override threshold.

12. The system of claim 11, wherein the primary user interaction type is associated with at least one of touch user input data, head tilt data, facial recognition data, audio data, image recognition data, body tracking data, accelerometer data, gyroscopic data, or device positioning data.

13. A computer-implemented method comprising:
causing display of a user interface that includes at least a first image and a second image from a first set of images for a first set of items in a perspective view;
receiving a first request to update the user interface;
determining a velocity to move at least the second image in the user interface based at least in part on the first request;
determining a first position of the second image;
determine a second position at which to present the second image based at least in part on the velocity, the first position, and a deceleration rate;
causing display of a first updated user interface that includes the second image at the second position, wherein the second image is partially presented in the first updated user interface, and wherein the first image is not presented in the first updated user interface;
designating the second image as a principal image based at least in part on a determination that the second position is within a threshold area;
causing display of a second updated user interface by updating the second position of the second image based at least in part on the designation of the second image as the principal image, wherein the second image is fully presented in the second updated user interface;
receiving a second request for an item set change;
determining a dimension based at least in part on the second request;
generating a cluster of a plurality of items according to the dimension and a respective value associated with each item of the plurality of items, wherein the plurality of items comprise a principal item associated with the principal image;
determining a second set of items, from the cluster, according to a distance between the principal item and at least one other item from the cluster;
determining a second set of images associated with the second set of items; and
causing display of a third updated user interface that includes at least two images from the second set of images, wherein at least one image from the second set of images is not included in the second updated user interface.

14. The computer-implemented method of claim 13, further comprising:
causing presentation of additional information associated with the second image in the second updated user interface based at least in part on a determination that an amount of time has elapsed without user interaction with the second updated user interface.

15. The computer-implemented method of claim 13, wherein the perspective view of at least the first image and the second image substantially follows a line or arc.

16. The computer-implemented method of claim 13, wherein at least the second image is selectable to cause presentation of additional data associated with the second image in the second updated user interface.

17. A computer-readable, non-transitory storage medium storing computer executable instructions that, when executed by one or more computing devices, configure the one or more computing devices to perform operations comprising:
causing display of a user interface that includes at least a first image and a second image from a first set of images for a first set of items, the second image presented at a first size and at a first position;
receiving a first request to update the user interface;
determining a velocity to move at least the second image in the user interface based at least in part on the first request;
determining a first position of the second image;

determining a second position at which to present the second image based at least in part on the velocity, the first position of the second image, and a deceleration rate, wherein the second position of the second image corresponds to a partial presentation of the second image in the user interface;

designating the second image as a principal image based at least in part on a determination that the second position is within a threshold area;

causing presentation of a first updated user interface that includes at least the second image at a third position based at least in part on the designation of the second image as the principal image, wherein the second image is fully presented at a second size in the first updated user interface, the second size being larger than the first size, and wherein the first image is not presented in the first updated user interface;

receiving a second request for an item set change;

determining a dimension based at least in part on the second request;

generating a cluster of a plurality of items according to the dimension and a respective value associated with each item of the plurality of items, wherein the plurality of items comprise a principal item associated with the principal image;

determining a second set of items, from the cluster, according to a distance between the principal item and at least one other item from the cluster;

determining a second set of images associated with the second set of items; and causing display of a second updated user interface that includes at least two images from the second set of images, wherein at least one image from the second set of images is not included in the first updated user interface.

18. The computer-readable, non-transitory storage medium of claim 17, wherein the one or more computing devices are configured to perform operations further comprising:

causing presentation of additional information associated with the second image in the first updated user interface based at least in part on a determination that an amount of time has elapsed without user interaction.

19. The computer-readable, non-transitory storage medium of claim 17, wherein the second image and a third image from the first set of images are presented in the first updated user interface in a perspective view.

20. The computer-readable, non-transitory storage medium of claim 17, wherein the dimension is associated with text data for the principal item, and wherein generating the cluster further comprises:

for each item of the plurality of items, generating a plot according to a respective text value for the item.

* * * * *